US006621239B1

(12) United States Patent
Belliveau

(10) Patent No.: US 6,621,239 B1
(45) Date of Patent: Sep. 16, 2003

(54) METHOD AND APPARATUS FOR CONTROLLING THE TEMPERATURE OF A MULTI-PARAMETER LIGHT

(76) Inventor: Richard S. Belliveau, 10643 Floral Park, Austin, TX (US) 78759

( * ) Notice: Subject to any disclaimer, the term of this patent is extended or adjusted under 35 U.S.C. 154(b) by 0 days.

(21) Appl. No.: 09/524,290

(22) Filed: Mar. 14, 2000

(51) Int. Cl.[7] .................................................. H04Q 1/00
(52) U.S. Cl. ........................ 315/312; 315/112; 315/316
(58) Field of Search ......................... 315/112–118, 312, 315/362, 308, 309, 307, 314, 316, 318, 324, 292–294

(56) References Cited

U.S. PATENT DOCUMENTS

| | | | | |
|---|---|---|---|---|
| 3,921,032 A | | 11/1975 | Hallay | |
| 4,283,658 A | | 8/1981 | Parker | |
| 4,392,187 A | | 7/1983 | Bohnhorst | |
| 4,451,767 A | | 5/1984 | Goralnik | |
| 4,672,271 A | | 6/1987 | Gear et al. | |
| 4,768,057 A | * | 8/1988 | Kumada et al. | 355/3 FU |
| 5,315,214 A | | 5/1994 | Lesea | |
| 5,367,444 A | | 11/1994 | Bohnhorst et al. | |
| 5,428,267 A | * | 6/1995 | Peil | 315/224 |
| 5,508,782 A | * | 4/1996 | Koh et al. | 315/309 |
| 5,515,254 A | | 5/1996 | Smith | |
| 5,565,903 A | * | 10/1996 | Ueda | 362/294 |
| 6,034,790 A | * | 3/2000 | Kamei et al. | 315/198 |
| 6,188,933 B1 | | 2/2001 | Hewlett et al. | 700/19 |
| 6,333,602 B1 | * | 12/2001 | Kayser | 315/292 |
| 6,352,358 B1 | * | 3/2002 | Lieberman et al. | 362/294 |

OTHER PUBLICATIONS

High End Systems, Inc., High End Systems On–Line Product Catalog, Cyberlight (www.highend.com/products/Cyberlight/cyb.html & /cyberfeat.html. & /cyberspec.html & /ps_cyber.html), 2000.

High End Systems, Inc., High End Systems On–Line Product Catalog, Studio Color 575 (www.highend.com/products/studiocolor575/studiocolor.html & /scolfeat.html. & /scolspec.html & /ps_stcolor575.html), 2000.

* cited by examiner

*Primary Examiner*—Don Wong
*Assistant Examiner*—Wilson Lee
(74) *Attorney, Agent, or Firm*—Altera Law Group, LLC

(57) ABSTRACT

A multi-parameter light is a type of theater light that includes a lamp in combination with one or more optical components such as reflectors, lenses, filters, iris diaphragms, shutters, and so forth for creating special lighting effects, various electrical and mechanical components such as motors and other types of actuators, wheels, gears, belts, lever arms, and so forth for operating the optical components, suitable electronics for controlling the parameters of the multi-parameter light, and suitable power supplies for the lamp, motors, and electronics. Typically, the lamp is enclosed by the lamp housing, which also contains the other optical components and many of the electrical and mechanical components which operate them. As the lamp and the various components within the lamp housing generate a great deal of heat and as various environmental conditions such as ambient air temperature and humidity can affect the amount of heat dissipated by whatever cooling technique is used in the multi-parameter light, the temperature within the lamp housing is managed by controlling the amount of power furnished to the lamp in accordance with the temperature sensed by one or more thermal sensor(s) positioned in appropriate location(s) preferably inside the lamp housing or on one or more of the cooling system components. As the sensed temperature deviates from a desired temperature specification, the output of the power supply for the lamp is adjusted so that the heat generated by the lamp is modified in such a way as to bring the sensed temperature back into specification.

44 Claims, 7 Drawing Sheets

METHOD AND APPARATUS FOR CONTROLLING THE TEMPERATURE OF A MULTI-PARAMETER LIGHT

BACKGROUND OF THE INVENTION

1. Field of the Invention

The present invention relates to theatre lighting, and more particularly to controlling the temperature of lighting devices such as multi-parameter lights that include both optical and electromechanical components.

2. Description of Related Art

Theatre lighting devices are useful for many dramatic and entertainment purposes such as, for example, Broadway shows, television programs, rock concerts, restaurants, nightclubs, theme parks, the architectural lighting of restaurants and buildings, and other events. A multi-parameter light is a theatre lighting device that includes a light source and one or more effects known as "parameters" that are controllable typically from a remotely located console. For example, U.S. Pat. No. 4,392,187 issued Jul. 5, 1983 to Bohnhorst and entitled "Computer controlled lighting system having automatically variable position, color, intensity and beam divergence" describes multi-parameter lights and a central control system. Multi-parameter lights typically offer several variable parameters such as pan, tilt, color, pattern, iris and focus.

A multi-parameter light typically employs a light source such as a high intensity lamp as well as motors and other motion components which provide the automation to the parameters. These components are typically mounted inside of a lamp housing and generate large amounts of heat inside of the lamp housing, so that cooling by convection or forced air is required. The high intensity lamp generates the greatest amount of heat. However, motors used to automate the parameters also generate significant amounts of heat. Heat generation by the motors is a function of the number of motors within a lamp housing as well as the usage of the motors. Heat generation increases with increasing numbers of motors and with repetitive use in a high duty cycle. Various optical components such as filters, projection patterns, shutters, and an iris diaphragm are used within the lamp housing to collimate the light and focus patterns to be projected. These optical components are selectively moved in and out of the light path or controllably varied in the light path by motors to vary the attributes of the projected light, and generate varying amounts of heat as they interact with the light beam by reflection or absorption.

Many variables affect the internal temperature of the lamp housing of a multi-parameter light. For example, lamps provided by different manufactures may have differences in lumens per watt, or may have a spectral distributions that create more energy in the infrared spectrum thus further raising the internal temperature of the multi-parameter light. The optical components in the lamp housing that are used to vary the parameters lie in the path of the projected light. These components may reflect or absorb light. Light collimated or condensed by the optical components may be reflected back into the lamp housing, the components of the lamp housing, or the lamp itself, causing a rise in temperature of the lamp housing and its components. Light may also be absorbed by the optical components when placed in the path of the projected light. As these components absorb the condensed or collimated light, they generate heat and raise the temperature within the lamp housing. The ambient air temperature to which the instrument is exposed may also raise the internal temperature of the lamp housing from 25 to 40 Celsius. The position of the multi-parameter lamp housing also is a factor in the operating temperature, since the position may allow heat to rise in certain areas of the lamp housing. The motors within the lamp housing when used repetitively for shows or events that often repeat the change of a parameter may raise the temperature inside of the lamp housing and its components by 5 to 15 degrees Celsius.

Because of the presence of such substantial amounts of heat, some multi-parameter lights are constructed of various high temperature materials. For example, the insulation of the wiring to the lamp may be silicon or Teflon. The lamp housing of the multi-parameter light may be constructed of a high temperature polymer, which additionally helps to reduce the weight of the light and is often molded into a pleasing design shape. However, as the heat capacity of even these materials is not infinite, various cooling techniques are used. The most common cooling techniques are convection and forced air cooling. An example of a convection cooled multi-parameter light is the model Studio Color® 575 wash fixture, available from High End Systems, Inc. of Austin, Tex., URL www.highend.com. In this type of multi-parameter light, the convection cooled lamp housing contains the lamp, motors, optics and mechanical components, and is rotatably attached to a yoke that facilitates pan and tilt. The yoke is rotatably attached to a base, which contains the power supplies and control and communications electronics. See also U.S. Pat. No. 5,515,254, issued May 7, 1996 to Smith et al. and entitled "Automated color mixing wash luminaire," and U.S. Pat. No. 5,367,444, issued Nov. 22, 1994 to Bohnhorst et al. and entitled "Thermal management techniques for lighting instruments." An example of a forced air cooled multi-parameter light is the model Cyberlight® automated luminaire, available from High End Systems, Inc. of Austin, Tex., URL www.highend.com. In this type of multi-parameter light, the forced-air cooled lamp housing is stationary and contains all of the necessary operating components, including a positionable reflector to achieve the pan and tilt parameters.

Neither convection cooling nor forced air cooling is entirely satisfactory. Convection cooling is quiet but does not dissipate as much heat as forced air cooling. Forced air cooling typically is achieved with fans which increase the operating noise of the multi-parameter light.

A technique found both in forced air cooled multi-parameter lights and convection cooled multi-parameter lights for dealing with excessive heat in the lamp housing involves the use of a thermal switch to turn off the lamp when the temperature inside of the lamp housing exceeds specification, and then to turn on the lamp when the inside of the lamp housing falls back to a cooler temperature. FIG. 1 is a block diagram of a forced air cooled multi-parameter light which has a lamp housing 40. The lamp housing 40 contains various optical components such as a reflector 45, a lamp 46, a condensing lens 47, three filter wheels 48, 49 and 51, an iris diaphragm 50 (motor omitted for clarity), and a focussing lens 52 (motor omitted for clarity). The lamp housing 40 also contains a thermal switch 43, a lamp power supply 44, and a power supply 53 to power the lamp, various motors and electronics of the multi-parameter light. The electronics 41 within the lamp housing 40 include a communications node for receiving communication and command signals from a remote console (not shown) to vary the parameters of the multi-parameter light, and a microprocessor for operating the electromechanical system of motors (not shown for clarity) of the multi-parameter light as well as for turning on and off a fan 42 in accordance with the command signals. For cooling purposes, air enters the interior of the lamp housing 40 through a intake vent 54, and is drawn through the lamp housing 40 by the fan 42, and exits the lamp housing 40 through the fan and exhaust vent 42. The thermal sensor 43 is located next to the ventilation exit near the fan 42, and responds to the temperature at that point inside of the lamp housing 40 by opening the line power circuit if the temperature exceeds specification and closing the line power circuit when the temperature falls back into specification. If pan and tilt parameters are desired, a positionable reflector system (not shown) is provided after the focussing lens 52 and typically outside of the housing 40, although the reflector system may be located inside of the housing 40 if desired.

FIG. 2 is a block diagram of a convection cooled multi-parameter light which has a lamp housing 55. The lamp housing 55 contains many of the same type of components as the multi-parameter light of FIG. 1 (the component values may of course be different). The electronics 56 within the lamp housing 55 include a communications node for receiving communication and command signals from a remote console (not shown) to vary the parameters of the multi-parameter light, and a microprocessor for operating the electromechanical system of motors (not shown for clarity) of the multi-parameter light. Air enters the interior of the lamp housing 55 through a intake vent 58 which has cooling fins, and is drawn through the lamp housing 55 by convection currents and exits the lamp housing 55 through an exhaust vent 57 which also has cooling fins. The various cooling fins may be connected to various components in the lamp housing 55 to help dissipate heat from those components. The thermal sensor 43 is located next to the ventilation exit near the exhaust vent 57, and responds to the temperature at that point inside of the lamp housing 55 by opening the line power circuit if the temperature exceeds specification and closing the line power circuit when the temperature falls back into specification.

Another technique found in forced air cooled multi-parameter lights for reducing the heat generated by the lamp involves the use of a variable speed fan which runs at high speed to provide a great deal of heat dissipation when required but otherwise runs at lower speeds to achieve adequate cooling with reduced fan noise. FIG. 3 is a block diagram of a forced air cooled multi-parameter light which has a lamp housing 60. The lamp housing 60 contains may of the same type of components as the multi-parameter light of FIG. 1 (the component values may of course be different), except that a thermal switch is not necessarily present in the line voltage circuit. Instead, a thermal sensor 66 monitors the temperature at a point inside of the lamp housing 60 and furnishes the measurements to a sensor interface 65. The sensor interface 65 is part of the electronics within the lamp housing 60, which also include a communications interface 61 for receiving communication and command signals from a remote console (not shown) to vary the parameters of the multi-parameter light, and a microprocessor 62 for operating the electromechanical system of motors (not shown for clarity) of the multi-parameter light through a motor control interface 64 and for operating the speed of a variable speed fan 67 through a fan control interface 63. Air enters the interior of the lamp housing 60 through an intake vent 68, and is drawn through the lamp housing 60 by the variable speed fan 67 and exits the lamp housing 60 through the variable speed fan 67. The microprocessor 62 monitors the temperature within the lamp housing 60 and adjusts the speed of the fan 67 to maintain the temperature within the lamp housing 60 within specification. Fan speed may be set by the microprocessor 62 in various ways, such as, for example, by consulting a temperature-to-fan speed ratio table stored in local memory (not shown) to which the microprocessor 42 has access in a manner well known in the art.

If desired, a thermal switch such as the switch 43 (FIG. 1) may be added to the multi-parameter light of FIG. 3 to provide protection against overheating when the fan 67 is operating at full speed.

FIG. 4 is a block diagram of a forced air cooled multi-parameter light that has the same type of components as the multi-parameter light of FIG. 3, but has separate base and lamp sections with respective housings 70 and 71. The base housing 70 contains the communications interface 61, the microprocessor 62, the fan control interface 63, the motor control interface 64, the thermal sensor interface 65, the lamp power supply 44, and the motor and electronics power supply 53. The lamp housing 71 contains the thermal sensor 66, the reflector 45, the lamp 46, the condensing lens 47, the filter wheels 48, 49 and 51, the iris diaphragm 50, and the focussing lens 52. Various wires are run between the base housing 70 and the lamp housing 71 (some wires are omitted for clarity) through a wireway 73, which typically is a flexible conduit or a pathway between the bearings used to attach the lamp housing 71 to the base housing 70 on pan and tilt lights. Air enters the interior of the lamp housing 71 through an intake vent 74, and is drawn through the lamp housing 71 by the variable speed fan 72 and exits the lamp housing 71 through the variable speed fan 72. The microprocessor 62 monitors the temperature within the lamp housing 71 and adjusts the speed of the fan 72 to maintain the temperature inside of the lamp housing 71 within specification.

In the multi-parameter lights of FIGS. 3 and 4, an electronic circuit controls the fan speed in accordance with signals from a thermal sensor. As the temperature inside of the lamp housing rises, the sensor provides a signal to the electronic circuit that in turn increases the speed of the fan. This increased fan speed provides greater airflow and in turn lowers the temperature of the lamp housing and the components contained therein. While effective for temperature control, this solution is disadvantageous in settings where the ambient temperature is high and a high noise level is not acceptable. Such settings are quite common. For example, multi-parameter lights are often operated in groups in, for example, churches, theatres and television studios, where the ambient temperature in the vicinity of a group of lights may rise to above about 50 degrees Celsius. When the ambient temperature is high, the variable speed fan of a multi-parameter light operates near or at maximum speed and creates noise. Since several fans operating in close proximity at maximum speed create quite a lot of noise, forced air cooled multi-parameter lights are not entirely suitable for use at locations where a high noise level is not acceptable.

Convection cooled multi-parameter lights may be used where the noise of a forced air cooled multi-parameter light is unacceptable. However, convection cooled multi-parameter lights typically utilize lamps that generate less heat and are constructed of expensive high temperature materials.

For either convection cooled or forced air cooled multi-parameter lights, a thermal sensor or thermal cutoff switch may be employed to remove the supply voltage to the lamp if the temperature monitored by the sensor reaches a maximum allowable safe temperature. Unfortunately, this means that if the multi-parameter light is operated in high enough ambient temperatures, the lamp may shut down. It is possible that during a performance event with high ambient temperatures, one or more of the multi-parameter lights in the event may inadvertently shut down, causing great inconvenience and distraction.

Permitting a multi-parameter light to run too hot is not a good option. As the temperature of the lamp housing increases, the temperature of all the components in the lamp housing also increases. Typically, lamp life is shortened. The motors used for the automation can easily reach critical operating temperatures and sustain damage. Electronic circuitry if contained within the lamp housing, may reach operating temperatures that greatly shorten the life of components therein such as semiconductors, capacitors and transformers. Additional components and materials used for the construction and proper operation of the instrument and lamp housing may also be affected, such as polymers, elastomers and lubricants.

SUMMARY OF THE INVENTION

One embodiment of the present invention is a multi-parameter light comprising a housing, a variable power supply having an output and a control input, a lamp contained at least in part within the housing and coupled to the output of the variable power supply, a parameter actuator contained at least in part within the housing, a thermal sensor contained within the housing, and a control circuit having an input coupled to the thermal sensor and an output coupled to the input of the variable power supply.

Another embodiment of the present invention is a multi-parameter light comprising housing means, light source means contained at least in part within the housing means, means for actuating a parameter contained at least in part within the housing means, means for applying power to the light source means, means for operating the actuating means, means for monitoring temperature of the multi-parameter light, and means for adjusting power to the light source means when the temperature monitoring means indicates a temperature that is discrepant with a predetermined temperature specification to bring the temperature of the multi-parameter light back to the predetermined temperature specification.

A further embodiment of the present invention is a method of controlling the operating temperature of a multi-parameter light having a housing, a lamp contained at least in part within the housing, and at least one parameter actuator contained at least in part within the housing. The method comprises applying power to the lamp, operating the parameter actuator, monitoring the operating temperature of the multi-parameter light to obtain a sensor signal indicative of the operating temperature, and adjusting power to the lamp when the sensor signal is discrepant with a predetermined temperature specification to bring the operating temperature back to the predetermined temperature specification.

DETAILED DESCRIPTION OF THE PREFERRED EMBODIMENT

Figure 1:
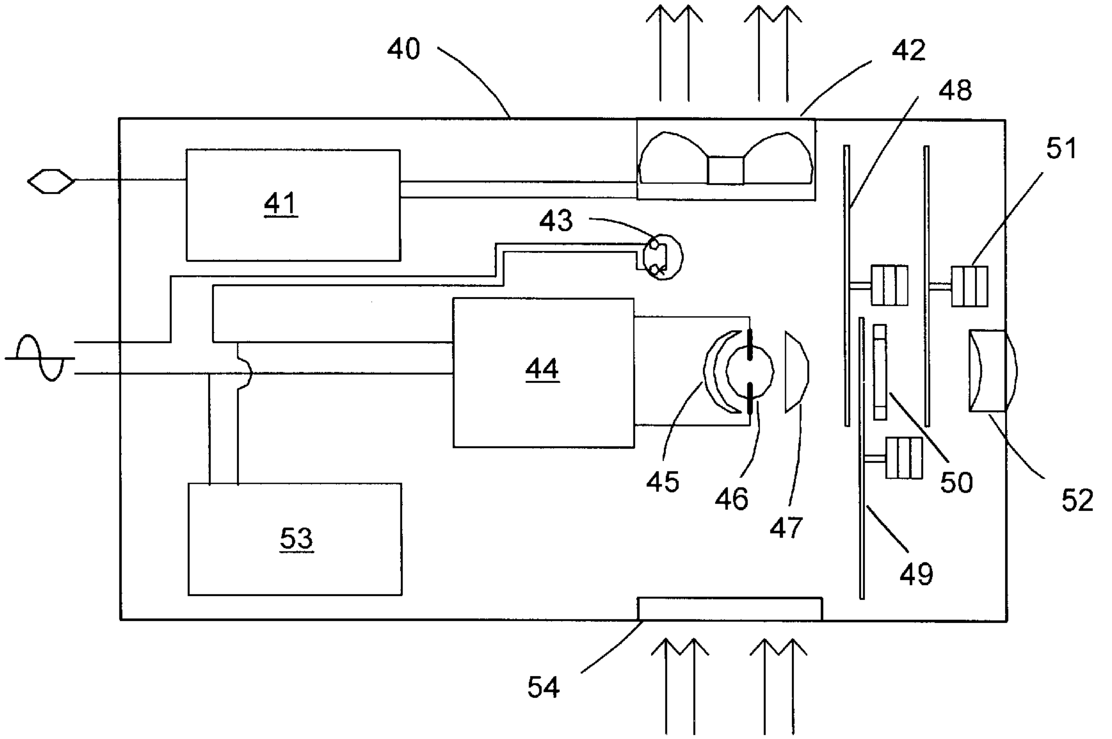
FIG 1 (PRIOR ART)
FIG. 1 is a block schematic diagram of a prior art force air cooled multi-parameter light with a thermal power line switch.
Figure 2:
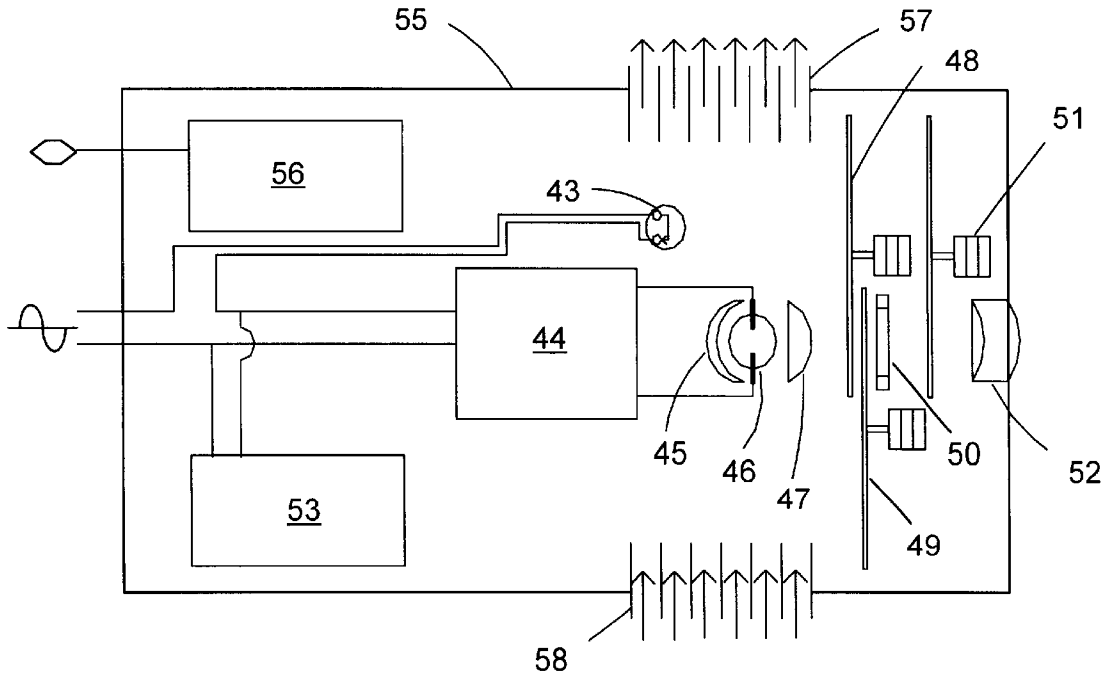
FIG 2 (PRIOR ART)
FIG. 2 is a block schematic diagram of a prior art convection cooled multi-parameter light with a thermal power line switch.
Figure 3:
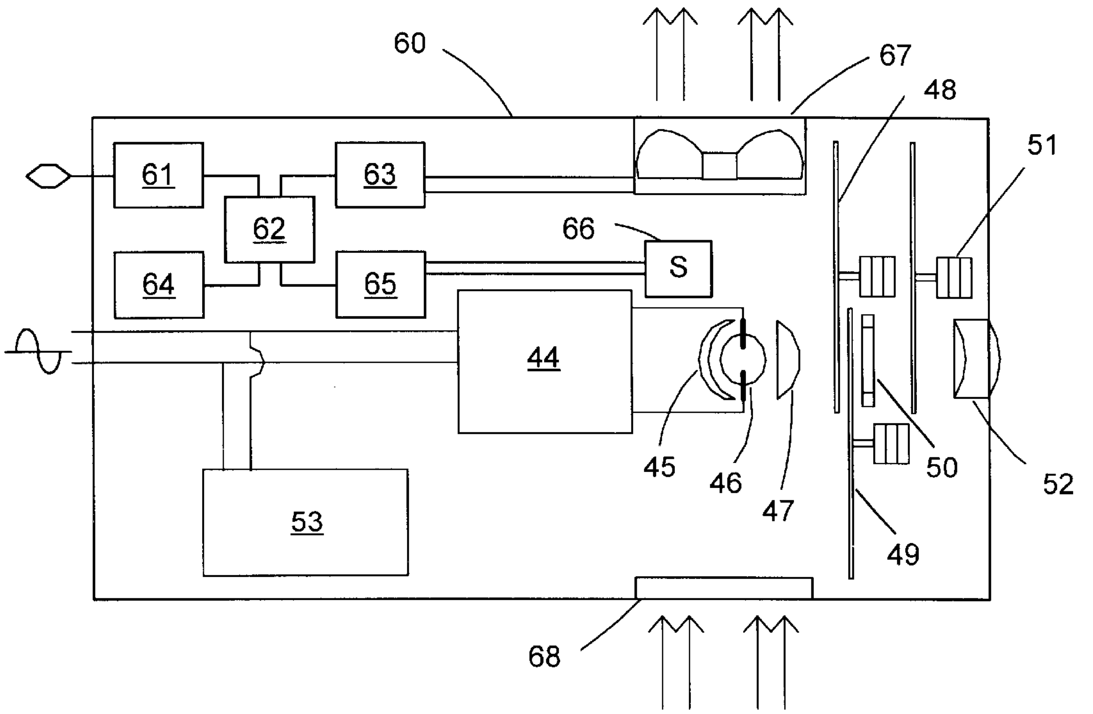
FIG 3 (PRIOR ART)
FIG. 3 is a block schematic diagram of a prior art force air cooled multi-parameter light with a variable speed fan.

A multi-parameter light is a type of theater light that includes a light source such as a lamp in combination with one or more optical components such as reflectors (the lamp and reflector may be integrated if desired), lenses, filters, iris diaphragms, shutters, and so forth for creating special lighting effects, various electrical and mechanical components such as motors and other types of actuators, wheels, gears, belts, lever arms, and so forth for operating the optical components, suitable electronics for controlling the parameters of the multi-parameter light, and suitable power supplies for the lamp, motors, and electronics. The lamp is contained at least in part within a lamp housing to suppress spurious light emissions. Typically, the lamp is completely enclosed by the lamp housing, which also contains the other optical components and many of the electrical and mechanical components which operate them. The power supplies and the electronics are also contained within the lamp housing in some types of multi-parameter lights, but are contained within a separate housing apart from the lamp housing in other types of multi-parameter lights.

As the lamp and the various components within the lamp housing generate a great deal of heat and as various environmental conditions such as ambient air temperature and humidity can affect the amount of heat dissipated by whatever cooling technique is used in the multi-parameter light, the temperature within the lamp housing is managed by controlling the amount of power furnished to the lamp in accordance with the temperature sensed by one or more thermal sensor(s) positioned in appropriate locations preferably inside the lamp housing or on one or more of the cooling system components. As the sensed temperature begins to deviate from a desired temperature specification, the output of the power supply for the lamp is adjusted so that the heat generated by the lamp is modified in such a way as to bring the sensed temperature back into specification.

The formulation of a temperature specification depends on the objectives of the designer or user. An example of a temperature specification is a limit temperature which should not generally be exceeded. An illustrative algorithm for implementing this temperature specification initially operates the lamp of the multi-parameter light at full rated power but reduces power to the lamp when the sensed temperature rises above the limit temperature as would typically result from unusual parameter operations and/or unfavorable ambient conditions. Another example of a temperature specification is a temperature range about the temperature rating of the particular lamp in use. An illustrative algorithm for implementing this temperature specification operates the multi-parameter light at whatever power is suitable for maintaining the sensed temperature within the specified range. Yet another example of a temperature specification is a primary temperature range about the temperature rating of the particular lamp in use, and a secondary temperature range above the temperature range to obtain greater luminosity, a different color temperature, or other desirable property. The sensed temperature may be in the primary temperature range indefinitely, but may be in the secondary temperature range only for a specified amount of time and only after a specified interval of time. An illustrative algorithm for implementing this temperature specification operates the lamp of the multi-parameter light at whatever power is suitable for maintaining the sensed temperature within the desired temperature range provided the duration and interval limits for the secondary temperature range are not exceeded.

The technique of varying the power to the lamp of a multi-parameter light to achieve a particular temperature specification over a variety of ambient conditions and operating modes of the multi-parameter light is of great advantage in both convection cooled systems and forced air cooled systems. The lamp housing and the components contained therein do not operate at excessive temperatures even though conditions exist that would otherwise create unacceptably high internal temperatures, or in the case of forced air cooled multi-parameter lights, unacceptably high fan noise levels. In other words, the fan of a multi-parameter light need not be operated faster to deal with high temperatures in the lamp housing. Additional advantages are realized by varying power to the lamp to maintain the sensed temperature at a relatively stable value even as the ambient temperature changes or as internal heat generation changes due to varying the light parameters. These advantages include maintaining the light output of the lamp at a relatively constant value, allowing a better estimation of lamp life before failure, and achieving color temperature uniformity between multi-parameter lights placed in high ambient temperature areas such as near ceilings and multi-parameter lights placed in low ambient temperature areas such as on stage. Where the variable power supply is designed to be capable of providing more power than necessary under normal operating conditions, additional advantages are realized by applying greater than normal power to the lamp when the ambient conditions are very cool, as in a demonstration room. These advantages include maintaining the sensed temperature at the desired relatively stable value under even unusually favorable ambient conditions, and obtaining the appropriate light output from the lamp. Advantageously, reducing power to the lamp when an excessive temperature is sensed avoids having to shut down the lamp. Yet another advantage of reducing power to the lamp when an excessive temperature is sensed is that heat generation by the power supply as well as by the lamp are both reduced, thereby positively reinforcing temperature compensation.

Figure 5:
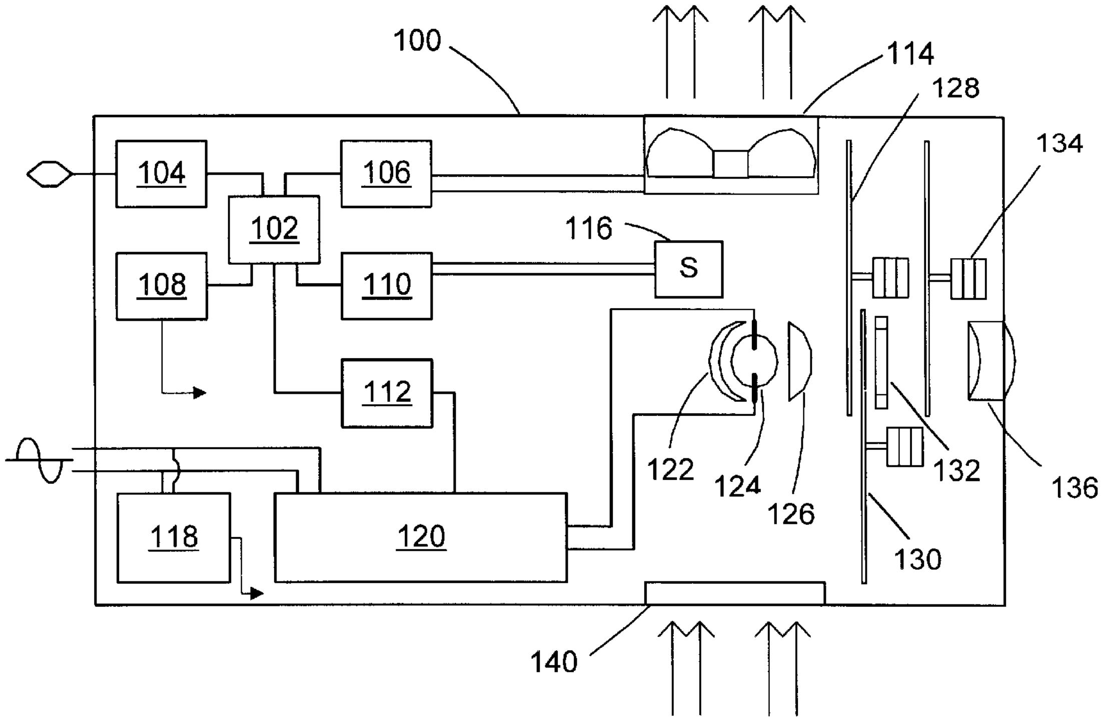
FIG. 5 is a block schematic diagram of a force air cooled multi-parameter light which is contained in a lamp housing and includes a variable lamp power supply for heat management.

FIG. 5 is a block diagram of a forced air cooled multi-parameter light which is capable of varying lamp power with temperature. A lamp housing 100 illustratively contains a number of conventional optical components well known in the art, such as, for example, a reflector 122, a lamp 124, a condensing lens 126, a filter wheel 128, another filter wheel 130, an iris diaphragm 132, another filter wheel 134, and a focussing lens 136. The lamp housing 100 also contains a control circuit which illustratively includes a microprocessor 102 (memory not shown), a communications interface 104, a fan interface 106 (which may be an interface for a variable speed fan or an on/off fan, as desired), a motor control interface 108 (control connections to motors not shown), a thermal sensor interface 110, and a variable power supply interface 112. The control circuit may be contained on a single logic card or on several logic cards, as desired. The lamp housing 100 has a forced air cooling system which includes an air intake vent 140 and a combination fan and exhaust vent 114. The fan 114 may be a one speed fan, a variable speed fan, or an on/off type fan. If desired, other fans and other vents may be used in the forced air cooling system, as is well known in the art; for example, a fan may be positioned at the intake vent 140 to push air into the lamp housing 100. A thermal sensor 116 illustratively is located near the fan and exhaust vent 114. The lamp housing 100 also contains various power supplies such as a motor and electronics power supply 118 (power connections to motors and electronics not shown), and a variable lamp power supply 120.

The thermal sensor 116 may be any type of thermal sensor, digital or analog. Many suitable types of thermal sensors are well known, and include the thermocouple, thermistor, integrated circuit temperature sensing devices, resistance temperature detectors ("RTDs"), radiation thermometers, and bimetallic thermometers. The thermal sensor 116 may be placed in any suitable location. For example, for a forced air cooled multi-parameter light, the best location for overall temperature regulation is a location close to the exhaust vent, although a location near the intake vent 140 would also be suitable in some light designs. For general temperature monitoring in convection cooled multi-parameter lights, for example, a suitable location for the sensor is on a metal plate or on the heat sink of the lamp housing in proximity to the light source. If desired, the sensor position may be chosen near a particular component such as the lamp 124 for precise control of the temperature thereof, or in a particular place within the lamp housing which tends to accumulate heat disproportionally under some conditions. Moreover, multiple sensors may be used if desired to monitor any combination of general temperature conditions, temperature conditions of particular components, and temperature conditions of particular places within the lamp housing. Signals from multiple sensors may be processed in numerous ways, such as, for example, by separately monitoring each signal and making thermal management decisions in the microprocessor 102 based on the individual values or on a derived statistical value such as an average or mean, or the signals may be combined in some manner such as by averaging in the interface and furnished to the microprocessor 102 as one signal. The mounting location and scheme are dependent to some extent on the type of thermal sensor used, as is well known in the art.

Figure 6:
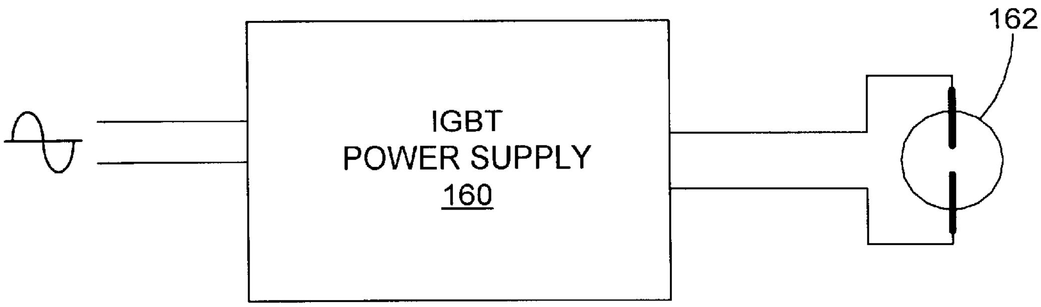
FIG. 6 is a block schematic diagram of a particular type of lamp and a suitable variable power supply.

The lamp 124 may be any suitable type, including arc lamps of the metal halide or xenon type, incandescent lamps, and solid state devices. The variable lamp power supply 120 may be implemented in various ways, depending on the type of lamp. For example, multi-parameter lights are typically designed with metal halide or xenon arc lamps. These lamps may be operated from a transformer or a solid state power supply. Some solid state power supplies utilize a type of semiconductor output device known as an Insulated Gate Bipolar Transistor, or IGBT, which can be used to provide an adjustable current to the lamp as is well known in the art. FIG. 6 is a block diagram showing an IGBT lamp power supply 160 and a metal halide or xenon arc lamp 162.

Figure 7:
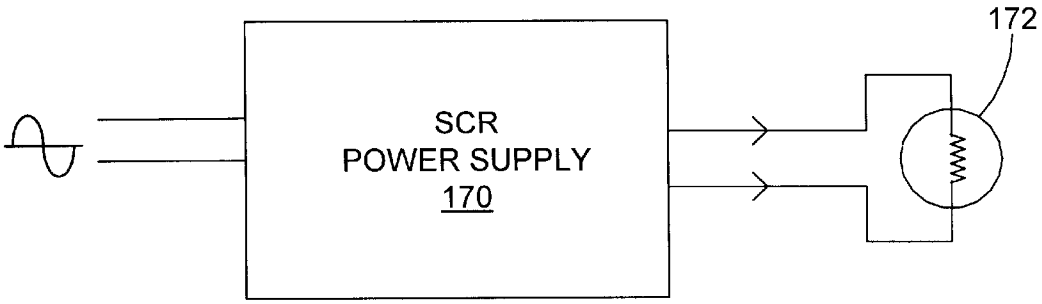
FIG. 7 is a block schematic diagram of another particular type of lamp and a suitable variable power supply.

Incandescent lamps may also be used as the light source for a multi-parameter light. These filament type lamps may be operated from a variety of variable power supply types. One type of suitable power supply uses silicon controlled rectifiers, or SCRs, to vary the power to the incandescent lamp in a manner well known in the art. FIG. 7 is a block diagram showing an SCR lamp power supply 170 and a filament lamp 172.

Figure 8:
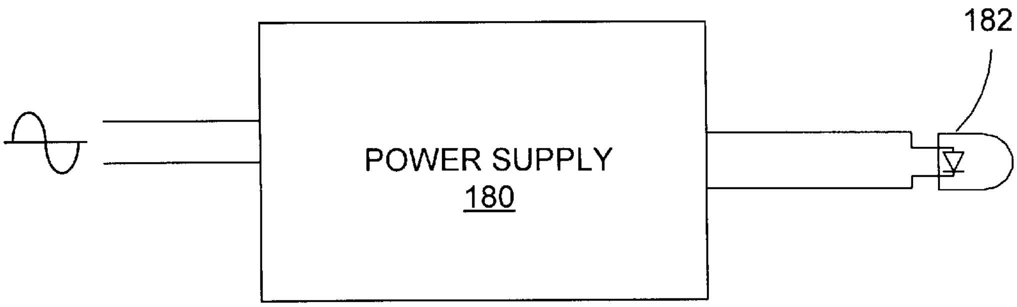
FIG. 8 is a block schematic diagram of yet another particular type of lamp and a suitable variable power supply.

Solid state lamps such as light emitting diodes, or LEDs, may also have power supplies constructed as to vary the power furnished to the lamp. One or more solid state light source(s) are used inside the lamp housing to achieve the desired specified maximum light output level. Various current and voltage control circuits may be used to adjust the power to the LEDs and hence the amount of heat generated by the LEDs in a manner well known in the art. FIG. 8 is a block diagram showing a suitable power supply 180 and an LED type lamp 182.

A variable power supply may also be obtained by passing the output of a fixed power supply through a variable inductance, through a voltage converter, or any other type of circuit capable of controllably varying a voltage, current or power to a lamp.

Figure 9:
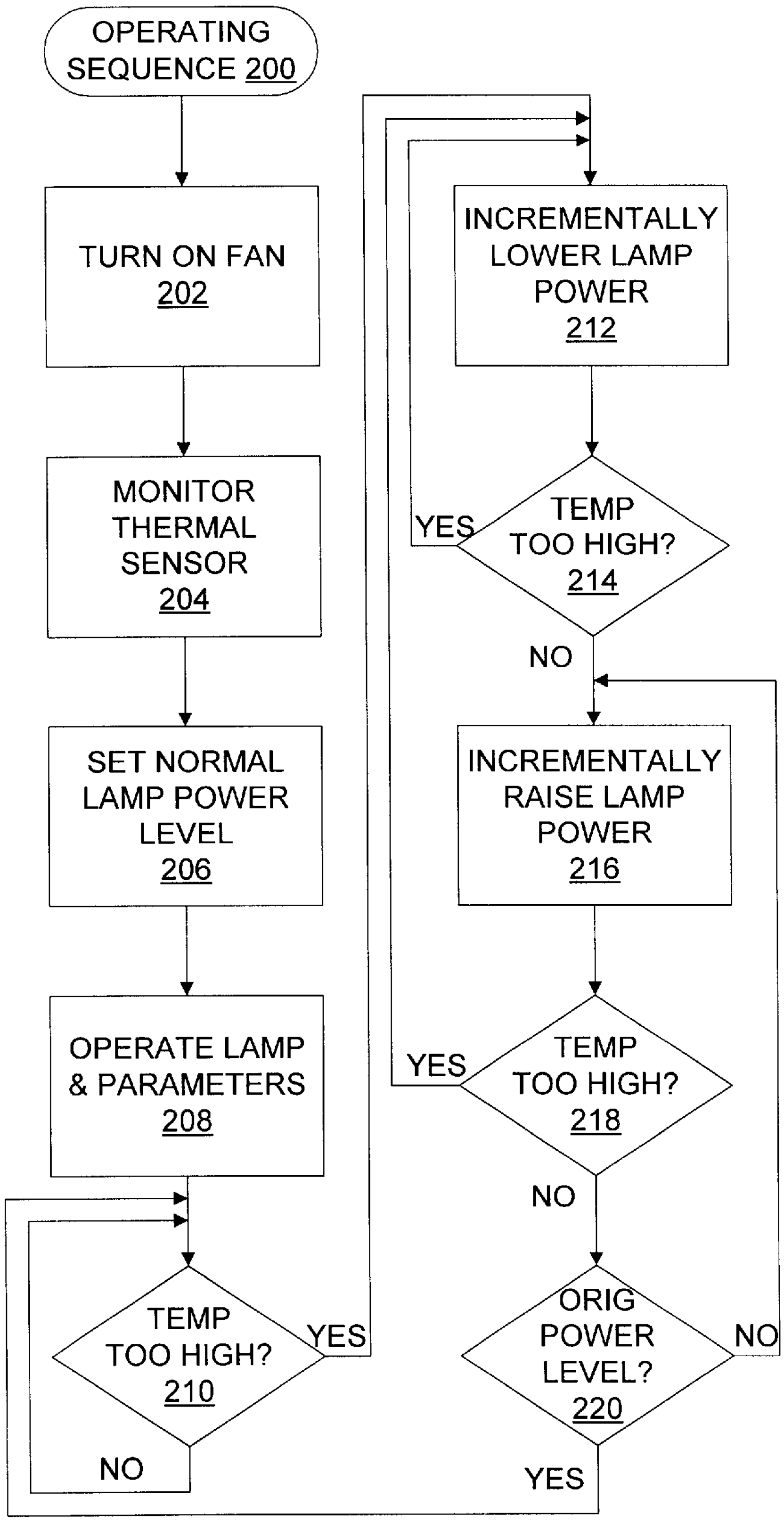
FIG. 9 is a flowchart of a method of operating the multi-parameter light of FIG. 5

An illustrative simple operating sequence 200 for the multi-parameter light of FIG. 5 is shown in FIG. 9. The operating sequence 200 functions to lower the sensed temperature by reducing the power supplied to the lamp 124 when a particular temperature is exceeded. In normal operation, the microprocessor 102 turns on the fan 114 (block 202), which is assumed to be a fixed speed fan in the case of the operating sequence 200, begins to monitor signals from the thermal sensor 116 (block 204), sets the lamp power level on the variable power supply 120 either to full power by default or to a particular power level based on a command received through the communications interface 104 (block 206), and operates the lamp 124 and various parameters through the variable power supply interface 112 and the motor control interface 108 in accordance with external commands received through the communications interface 104 (block 208). The lamp 124 initially is operated at either the default or the commanded power level, usually full power. The microprocessor 102 continually checks whether the sensed temperature of the multi-parameter light is too high (block 210—no) by monitoring the thermal sensor 116. If the temperature is not satisfactory as determined by the microprocessor 102 running any appropriate algorithm (block 210—yes), the microprocessor 102 incrementally lowers the power applied to the lamp 124 by adjusting the variable power supply 120 to any suitable degree through the variable power supply interface 112 (block 212). For example, the increment may be a predetermined fixed amount or may be a variable amount generated by an algorithm or from consulting a lookup table. Block 212 is repeated for as long as the temperature remains too high (block 214—yes). If the temperature is satisfactory (block 214—no), the microprocessor 102 incrementally increases the power applied to the lamp 124 by adjusting the variable power supply 120 through the variable power supply interface 112 (block 216). Block 216 is repeated provided that the temperature does not again become too high (block 218—no) and the original setting has not yet be attained (block 220—no). If the temperature again exceeds a particular value (block 218—yes), block 212 is returned to. If the original setting has been attained (block 220—yes), block 210 is returned to.

Figure 4:
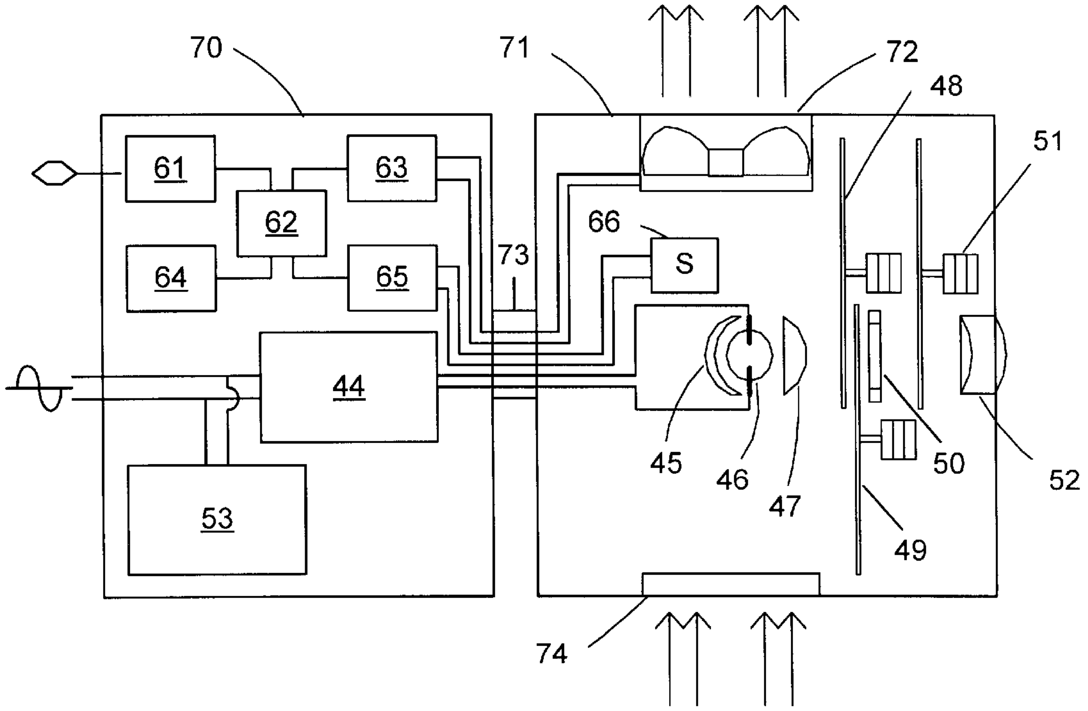
FIG 4 (PRIOR ART)
FIG. 4 is a block schematic diagram of a prior art force air cooled multi-parameter light having a base section and a lamp section, the lamp section having a variable speed fan.
Figure 10:
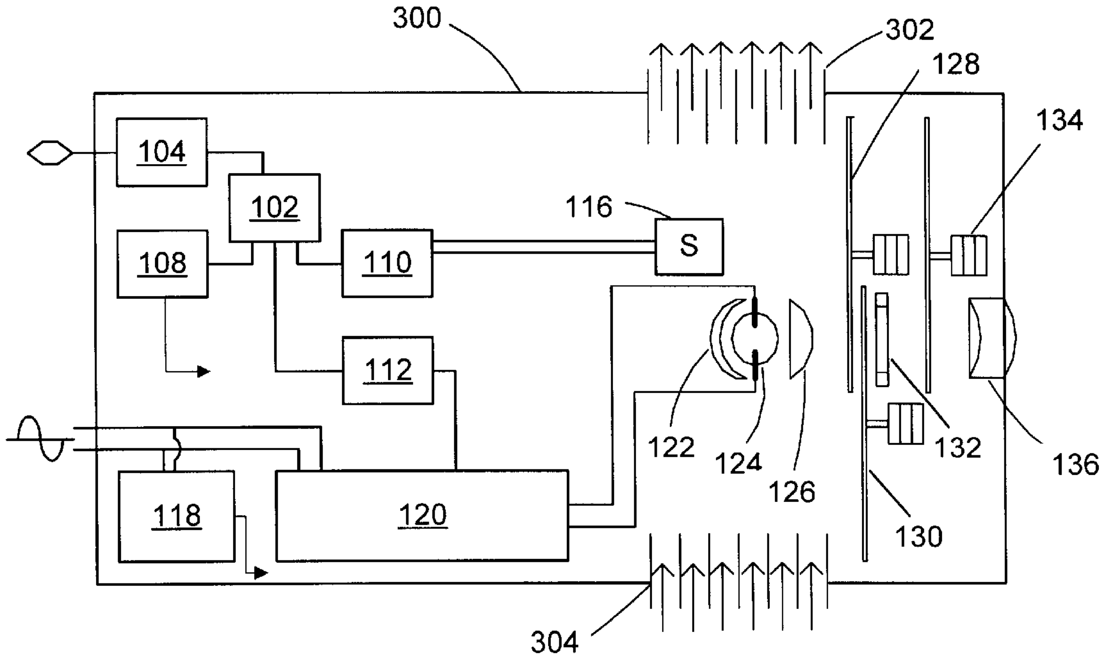
FIG. 10 is a block schematic diagram of a convection cooled multi-parameter light which is contained in a lamp housing and includes a variable lamp power supply for heat management.

FIG. 10 shows a convection cooled multi-parameter light that lacks the forced air cooling components of the multi-parameter light of FIG. 5 but is otherwise similar to it. The lamp housing 300 contains all of the same type of components as contained in the lamp housing 100 of FIG. 4 except for the intake vent 140, the fan and exhaust vent 114, and the fan control interface 106. Instead, the lamp housing 300 includes a convection intake vent 304 and a convection exhaust vent 302. The multi-parameter light of FIG. 10 may be operated using the same operating sequence 200 used for the multi-parameter light of FIG. 5, except that the block 202 for turning on the fan is omitted since no fan is present.

The multi-parameter lights of FIGS. 5 and 10 may, if desired, include a thermal cutoff switch or sensor in the power line for safety and redundancy. The technique of varying lamp power is of great advantage for in allowing both convection cooled and forced air cooled multi-parameter lights to continue to operate under conditions that may otherwise result in a disconnection of the lamp supply voltage by the thermal cutoff switch during a performance. Advantageously, as the variables that cause a rise in temperature over the specified temperature range are applied, the lamp power is reduced before reaching the trigger level of the thermal switch. This allows the multi-parameter light to remain within the target design operating temperature and continue to operate, while still providing for cutting off power to the lamp under extreme conditions or in an emergency.

It will be appreciated that the multi-parameter lights of FIGS. 5 and 10 may be implemented if desired with a base housing (not shown) separate from the lamp housing (not shown). The base housing may contain such components as, for example, the microprocessor 102 and associated memory, the communications interface 104, the fan interface 106 (FIG. 5), the motor control interface 108, the thermal sensor interface 110, the variable power supply interface 112, the motor and electronics power supply 118, and the variable lamp power supply 120. The lamp housing (not shown) may contain such components as, for example, the thermal sensor 116, the reflector 122, the lamp 124, the condensing lens 126, the filter wheel 128, the filter wheel 130, the iris diaphragm 132, the filter wheel 134, the focussing lens 136, the air intake mechanism (intake vent 140 in FIG. 5, intake vent 304 in FIG. 6), and the exhaust mechanism (combination fan and exhaust vent 114 in FIG. 5, exhaust vent 302 in FIG. 6).

Any suitable method may be used to control power to the lamp as a function of temperature sensed at the thermal sensor(s), although preferably the thermal sensor(s) furnishes information to a control circuit which preferably includes a microprocessor. Alternatively, the control circuit may perform thermal management using hardwired logic or by programmable logic. Whether hardware, software or firmware implemented, the control circuit processes the signal received from the thermal sensor to obtain suitable control signals which are applied to the control input of the lamp power supply to adjust the power to the lamp. In a microprocessor implementation, for example, the microprocessor preferably uses operational codes to generate a control signal for setting the output power of the power supply in relation to the temperature sensed by the thermal sensor. For instance, it might be preferred not to change the power to the lamp until a temperature variance of greater than 10 degrees from the desired design temperature of the lamp is indicated by the thermal sensor. In this example, the operational code of the microprocessor would instruct the microprocessor to not make a change in lamp dissipation when a 10 degree temperature rise over the design temperature is sensed, but instead to start the reduction of power to the lamp when an 11 degree change is sensed. The control circuit advantageously controls the power to the lamp to affect the amount of heat from the lamp linearly or nonlinearly and directly or indirectly with respect to the temperature sensed by the thermal sensor, and may also take other factors into consideration. Examples of such other factors include the rate of temperature change, the mean or average temperature over a period of time, the degree of similarity of the present temperature variations with stored profiles of commonly encountered temperature events, degree of control sensitivity, degree of control hysteresis, the type of lamp in use, the age of the lamp in use, and so forth.

In a forced air cooled multi-parameter light having one or more fans that are turned on or off as required or a variable speed fan to provide a suitable amount of forced air cooling while operating at the lowest possible speed, the technique of varying lamp power may be applied to great advantage to limit the amount of fan noise. For example, during setup a maximum allowable fan speed setting—which may be significantly less than the maximum speed of the fan—is determined based on the maximum amount of fan noise that is acceptable for the event. During the event, the lamp of the multi-parameter light is operated at normal lamp power and the fan is operated at or under the maximum desired fan speed setting provided the temperature sensed in the multi-parameter light is within specification. If the fan is operating at the maximum allowable speed setting but the temperature of the multi-parameter light exceeds specification or is trending toward exceeding specification or otherwise indicates an undesirable thermal situation as determined by the particular control algorithm being used, then the power to the lamp is reduced until the sensed temperature returns to specification.

Generally, the technique of varying lamp power may be used alone or combined with many other temperature control techniques to achieve a dynamic compromise that maximizes performance of the multi-parameter light while keeping the sensed temperature of the multi-parameter light within a particular range or above or below particular values in response to variations in the sensed temperature. Various algorithms may be used to compensate for changes in the sensed temperature of the multi-parameter light depending on the type of compromise sought, including the algorithm shown in FIG. 9 for implementing a maximum temperature specification, and the algorithm shown in FIG. 11 for implementing a temperature range specification. In a microprocessor implementation, the algorithm and temperature specification are stored locally in the form of stored operational code and data which are used by the microprocessor to decide how much and when to alter lamp power as well as fan speed if a variable speed fan is present, and possibly also modify or prohibit the operation of certain parameters that tend to generate a great amount of heat at times when the sensed temperature is high. For example, fan speed may be set by the microprocessor in various ways, such as, for example, by consulting a temperature-to-fan speed ratio table stored in local memory (not shown) as is well known in the art. Protected by the combination of variable speed forced air cooling and variable lamp power, a multi-parameter light can continue to operate even while being subjected to wide variations in ambient temperature conditions and internal heat generation. Moreover, a multi-parameter light that has the capability of varying both fan speed and lamp power may preferentially vary one or both factors in whichever way is most effective under the circumstances to compensate for the sensed temperature change, thereby achieving an optimal result.

Figure 11:
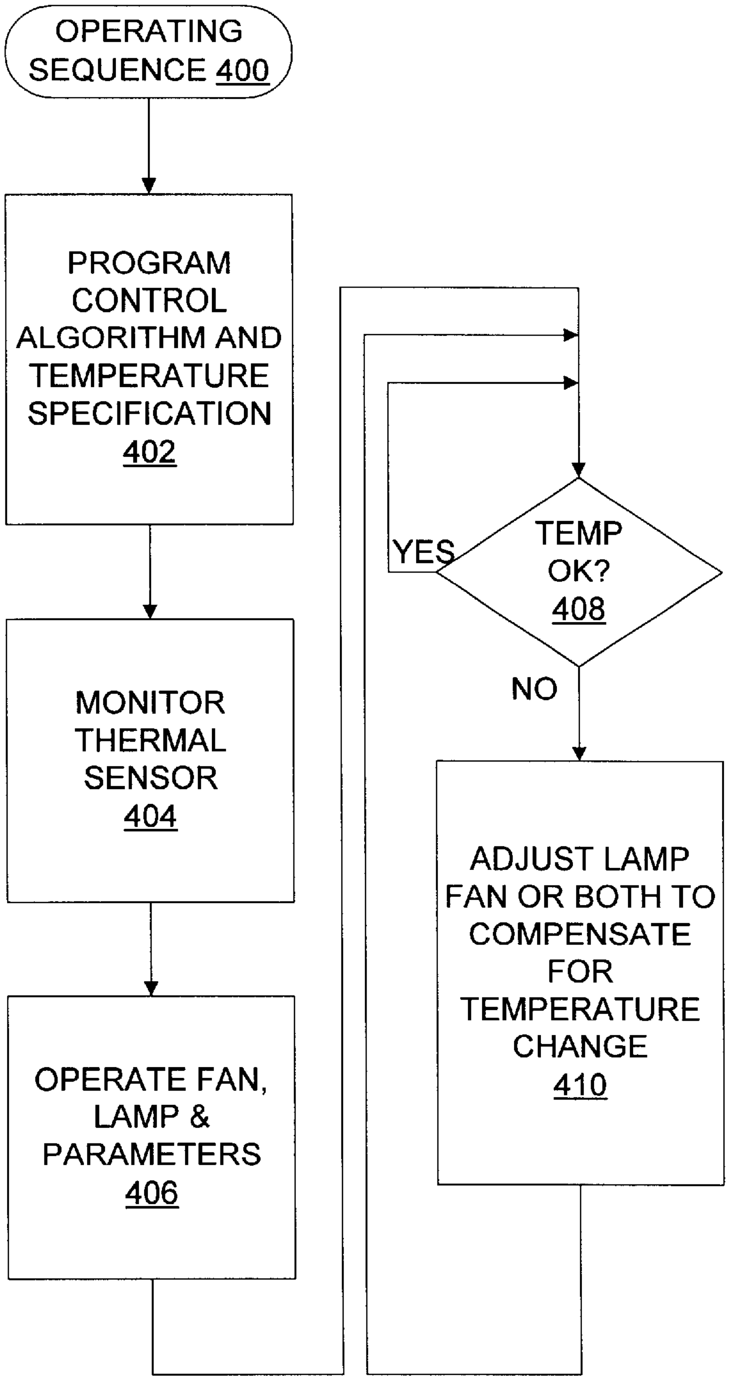
FIG. 11 is a flowchart of another method of operating the multi-parameter light of FIG. 5.

An illustrative operating sequence 400 for the multi-parameter light of FIG. 5, which maintains a desired operating temperature by varying fan speed or lamp power or both in the most effective manner in accordance with, for example, the rate of change in the sensed temperature is shown in FIG. 11. The fan 114 is assumed to be a variable speed fan in the case of the operating sequence 400. To begin operation, the microprocessor 102 is programmed with the control algorithm and the temperature specification (block 402) preferably based on one or more commands received through the communications interface 104. Once programmed, the microprocessor 102 monitors signals from the thermal sensor 116 (block 404) and operates the fan, lamp and various parameters through the variable power supply interface 112, the fan motor interface 106, and the motor control interface 108 in accordance with external commands received through the communications interface 104 (block 406). The microprocessor 102 then checks whether the sensed temperature of the multi-parameter light is discrepant with the temperature specification (block 408) by comparing the temperature of the multi-parameter light 100 as sensed by the thermal sensor 116 with the stored temperature specification. If the sensed temperature is satisfactory (block 408—yes), the microprocessor 102 continues to check whether the sensed temperature is discrepant with the temperature specification. If the sensed temperature is not satisfactory (block 408—no)—a condition which may arise if the sensed temperature is too high or too low relative to a range temperature specification or if the sensed temperature is too high relative to a limit temperature specification, for example—the microprocessor 102 adjusts the speed of the fan 114 in any suitable degree through the fan interface 106, or adjusts the variable power supply 120 to any suitable degree through the variable power supply interface 112, or both in accordance with the rate of change in the sensed temperature to compensate for that change (block 410). For example, if the temperature is rising rapidly out of a specified range or above a specified limit, the microprocessor 102 may have to both increase the speed of the fan 114 and decrease the power to the lamp 124 to bring the sensed temperature back into the specified range in a timely manner. On the other hand, if the temperature is rising slowly out of the specified range or above a specified limit, the microprocessor 102 may need only to slightly decrease the power to the lamp. Once the adjustment is made, the microprocessor 102 again checks whether the sensed temperature of the multi-parameter light is discrepant with the temperature specification (block 408), and the process is repeated as necessary to compensate for any temperature change.

The lamp power supply may be provided with suitable logic and a suitable thermal sensor so that it may be connected to the thermal sensor without the intervention of a microprocessor and adjust its power output to the lamp based on the signals from the thermal sensor. As for the thermal sensor 116 of FIGS. 5 and 10, a thermal sensor that connects to the logic circuits of a variable power supply may send the information to the power supply over single or multiple wires, and the signals generated by the thermal sensor may be varying voltages, varying currents, varying frequencies, digital values, or any other types of information carrying signals. Some examples of these variations are shown in FIGS. 12 and 13.

Figure 12:
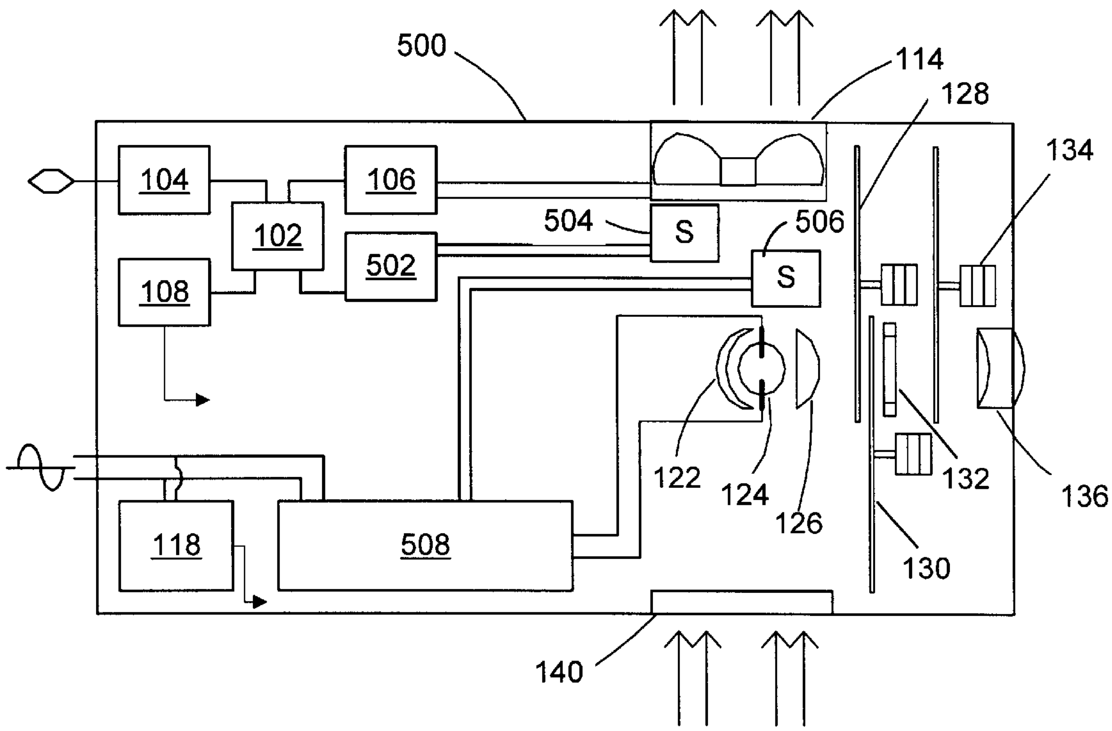
FIG. 12 is a block schematic diagram of a force air cooled multi-parameter light which is contained in a lamp housing and includes another type of variable lamp power supply for heat management.

FIG. 12 is a schematic block diagram of a force air cooled multi-parameter light like that of FIG. 5, except that two thermal sensors 504 and 506 are located within the lamp housing 500. The thermal sensor 504 provides signals through interface 502 to the microprocessor 102, which either controls the speed of the fan 114 or turns the fan 114 on/off depending on whether the fan is a variable speed fan. The additional thermal sensor, thermal sensor 506, provides signals to the variable lamp power supply 508, and the variable lamp power supply 508 is designed to receive such signals and adjust its power output to the lamp 124 in accordance therewith using any suitable control circuit and any suitable algorithm. Additional thermal sensors may be used as desired.

Figure 13:
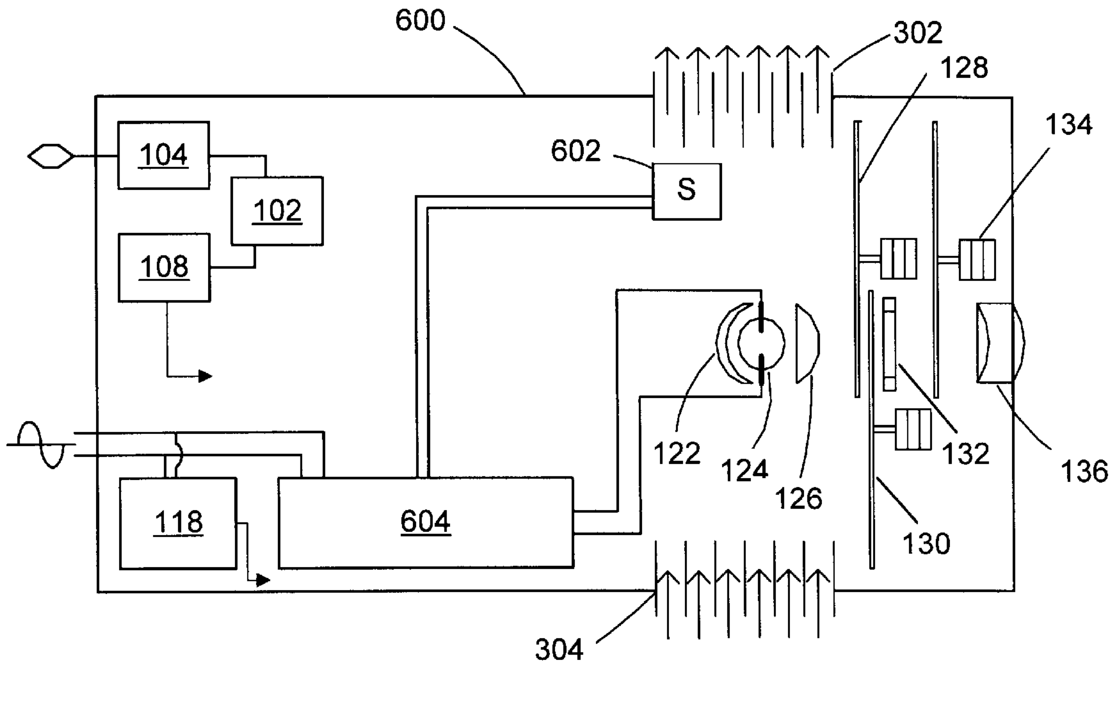
FIG. 13 is a block schematic diagram of a convection cooled multi-parameter light which is contained in a lamp housing and includes another type of variable lamp power supply for heat management.

FIG. 13 is a schematic block diagram of a convection cooled multi-parameter light like that of FIG. 10, except that thermal sensor 602 provides signals to the variable lamp power supply 604, and the variable lamp power supply 604 is designed to receive such signals and adjust its power output to the lamp 124 in accordance therewith using any suitable control circuit and any suitable algorithm. Additional thermal sensors may be used as desired.

The description of the invention and its applications as set forth herein is illustrative and is not intended to limit the scope of the invention as set forth in the following claims. Variations and modifications of the embodiments disclosed herein are possible, and practical alternatives to and equivalents of the various elements of the embodiments are known to those of ordinary skill in the art. For example, the thermal sensor may be placed in many different locations, multiple thermal sensors may be used, and various different types of control circuits, interfaces, variable voltage/current/power power supplies, and lamps may be used. Where a fan is used for forced air cooling, the fan may be located at the intake vent or the exhaust vent or other location as desired, and multiple fans may be used if desired. While the various parameter actuators may be motors, other types of actuators such as solenoid, rotary solenoid, and pneumatic may be used if desired. These and other variations and modifications of the embodiments disclosed herein may be made without departing from the scope and spirit of the invention as set forth in the following claims.

What is claimed is:

1. A multi-parameter theatre light comprising:

a housing;

a variable power supply having an output and a control input;

a lamp contained at least in part within the housing and coupled to the output of the variable power supply;

a theatre light parameter actuator contained at least in part within the housing;

a thermal sensor contained within the housing; and a control circuit having an input coupled to the thermal sensor and an output coupled to the input of the variable power supply for controlling power to the lamp during operation as a function of input from the thermal sensor;

wherein the variable power supply is an IGBT power supply and the lamp is an arc lamp.

2. A multi-parameter theatre light comprising:

a housing;

a variable power supply having an output and a control input;

a lamp contained at least in part within the housing and coupled to the output of the variable power supply;

a theatre light parameter actuator contained at least in part within the housing;

a thermal sensor contained within the housing; and a control circuit having an input coupled to the thermal sensor and an output coupled to the input of the variable power supply for controlling power to the lamp during operation as a function of input from the thermal sensor, wherein the variable power supply is an SCR power supply and the lamp is an incandescent lamp.

3. A multi-parameter theatre tight comprising:

a housing;

a variable power supply having an output and a control input;

a lamp contained at least in part within the housing and coupled to the output of the variable power supply;

a theatre light parameter actuator contained at least in part within the housing;

a thermal sensor contained within the housing; and a control circuit having an input coupled to the thermal sensor and an output coupled to the input of the variable power supply for controlling power to the lamp while the lamp is in operation as a function of input from the thermal sensor;

wherein the lamp comprises at least one LED.

4. A multi-parameter theatre light comprising:

a housing;

a variable power supply having an output and a control input;

a lamp contained at least in part within the housing and coupled to the output of the variable power supply;

a theatre light parameter actuator contained at least in part within the housing;

a thermal sensor contained within the housing;

an additional thermal sensor;

a forced air cooling system having a fan; and a control circuit comprising a logic circuit having an input coupled to the thermal sensor and an output coupled to the control input of the variable power supply for controlling power to the lamp during operation as a function of input from the thermal sensor, and an additional logic circuit having an input coupled to the additional thermal sensor and an output coupled to the fan;

wherein the control circuit and the variable power supply are integrated into a control variable power supply.

5. A multi-parameter theatre light comprising:

housing means;

light source means contained at least in part within the housing means;

means for actuating a theatre light parameter contained at least in part within the housing means;

means for applying power to the light source means;

means for operating the actuating means;

means for monitoring temperature of the multi-parameter light or at least one component thereof as influenced by operation of the actuating means; and means for adjusting power to the light source means while the tight source means is in operation and when the temperature monitoring means indicates a temperature that is discrepant with a predetermined temperature specification to bring the temperature of the multi-parameter light or at least one component thereof back to the predetermined temperature specification.

6. A method of controlling the operating temperature of a multi-parameter theatre light or at least one component thereof having a housing, a lamp contained at least in part within the housing, and at least one theatre light parameter actuator contained at least in part within the housing, comprising:

applying power to the lamp;

operating the theatre light parameter actuator;

monitoring the operating temperature to obtain a sensor signal indicative of the operating temperature as influenced by the theatre light parameter actuator operating step; and adjusting power to the lamp while the lamp is in operation and when the sensor signal is discrepant with a predetermined temperature specification to bring the operating temperature back to the predetermined temperature specification.

7. A method as in claim 6 wherein:

the predetermined temperature specification is a temperature limit; and the adjusting step comprises reducing power to the lamp when the sensor signal indicates a temperature in excess of the temperature limit to bring the operating temperature back to the predetermined temperature specification.

8. A method as in claim 6 wherein the predetermined temperature specification is a temperature range, and wherein the adjusting step comprises:

reducing power to the lamp when the sensor signal indicates a temperature above the temperature range to bring the operating temperature back to the predetermined temperature specification; and increasing power to the lamp when the sensor signal indicates a temperature below the temperature range to bring the operating temperature back to the predetermined temperature specification.

9. A method as in claim 6 wherein the multi-parameter light further includes a forced air cooling system having a fan with a variable speed, further comprising:

operating the fan; and adjusting the speed of the fan at times when the sensor signal is discrepant with the predetermined temperature specification to bring the operating temperature back to the predetermined temperature specification.

10. A method as in claim 6 further comprising modifying the theatre light parameter actuator operating step when the sensor signal is discrepant with the predetermined temperature specification to bring the operating temperature back to the predetermined temperature specification.

11. A multi-parameter theatre light comprising:

a housing;

a variable power supply having an output and a control input;

a lamp contained at least in part within the housing and coupled to the output of the variable power supply;

a theatre light parameter actuator contained at least in part within the housing;

a thermal sensor contained within the housing; and a control circuit having an input coupled to the thermal sensor and an output coupled to the control input of the variable power supply for controlling power to the lamp while the lamp is in operation as a function of input from the thermal sensor.

12. A multi-parameter theatre light as in claim 11 wherein the control circuit comprises:

a microprocessor coupled to the control input of the variable power supply; and a sensor interface circuit having an input coupled to the thermal sensor and an output coupled to the microprocessor.

13. A multi-parameter theatre light as in claim 11 further comprising a convection cooling system.

14. A multi-parameter theatre light as in claim 11 further comprising a forced air cooling system having a fan.

15. A multi-parameter theatre light as in claim 14 wherein the control circuit comprises:

a microprocessor coupled to the control input of the variable power supply;

a sensor interface circuit having an input coupled to the thermal sensor and an output coupled to the microprocessor; and a fan control interface circuit having an input coupled to the microprocessor and an output coupled to the fan.

16. A multi-parameter theatre light as in claim 11 wherein the control circuit comprises a logic circuit having an input coupled to the thermal sensor and an output coupled to the control input of the variable power supply.

17. A multi-parameter theatre light as in claim 16 wherein the control circuit and the variable power supply are integrated into a controllable variable power supply.

18. A multi-parameter theatre light as in claim 17 further comprising a convection cooling system.

19. A multi-parameter theatre light as in claim 11 wherein the variable power supply is contained in the housing.

20. A multi-parameter theatre light as in claim 11 comprising an additional housing, the variable power supply being contained in the additional housing.

21. A method of controlling operating temperature of a theatre lighting device or at least one component thereof comprising a lamp that dissipates heat when in use, and at least one component that is related to a parameter of the theatre lighting device and dissipates heat when in use, the method comprising:

applying power to the lamp, wherein the operating temperature is influenced;

using the parameter during at least part of the power applying step to obtain a theatre effect, wherein the operating temperature is influenced; and varying the power during the power applying step to maintain the operating temperature in conformity with a predetermined temperature specification.

22. The method of claim 21 wherein the predetermined temperature specification is a temperature limit; and the power varying step comprises reducing power to the lamp when the operating temperature increases beyond the temperature limit.

23. The method of claim 21 wherein the predetermined temperature specification is a temperature range, and wherein the power varying step comprises:

reducing power to the lamp when the operating temperature rises above the temperature range; and increasing power to the lamp when the operating temperature falls below the temperature range.

24. The method of claim 21 wherein the theatre lighting device further comprises an exhaust vent and a thermal sensor disposed close to the exhaust vent, the operating temperature being represented at least in part by an electronic signal from the thermal sensor.

25. The method of claim 21 wherein the theatre lighting device further comprises a heat sink and a thermal sensor disposed on the heat sink, the operating temperature being represented at least in part by an electronic signal from the thermal sensor.

26. The method of claim 21 wherein the theatre lighting device further comprises a thermal sensor disposed on the parameter-related component, the operating temperature being represented at least in part by an electronic signal from the thermal sensor.

27. The method of claim 21 wherein the theatre lighting device further comprises a thermal sensor disposed near the lamp, the operating temperature being represented at least in part by an electronic signal from the thermal sensor.

28. The method of claim 21 wherein the theatre lighting device further comprises a plurality of thermal sensors disposed so as to monitor general temperature conditions, temperature conditions of particular components, temperature conditions of particular places within the lamp housing, or any combination thereof, the operating temperature being represented at least in part by an electronic signal from the thermal sensors.

29. The method of claim 21 wherein the theatre lighting device further comprises a housing at least in part containing the lamp and the parameter, the temperature specification including a predetermined upper limit to prevent damage to the housing.

30. The method of claim 21 wherein the temperature specification includes a predetermined upper limit to avoid shut down of the lamp.

31. The method of claim 21 wherein the temperature specification includes a predetermined upper limit to avoid exceeding a temperature rating of the lamp.

32. The method of claim 21 wherein the theatre lighting device further comprises a power supply coupled to the lamp, the temperature specification including a predetermined upper limit to limit heat generation by the power supply.

33. The method of claim 21 wherein the temperature specification includes a predetermined lower limit to increase light output from the lamp under unusually favorable ambient conditions.

34. The method of claim 21 wherein the temperature specification includes a predetermined upper limit to modify use of the parameter.

35. The method of claim 21 wherein the theatre lighting device further comprises a cooling fan having a variable speed, the method further comprising:

operating the fan during at least part of the power applying step; and adjusting operation of the fan during at least part of the power applying step to maintain the operating temperature in conformity with the predetermined temperature specification.

36. The method of claim 35 wherein the fan operation adjusting stop and the power varying step at least partially overlap.

37. The method of claim 36 wherein the fan operation adjusting step is limited to a selected fan speed to avoid excessive fan noise.

38. The method of claim 21 wherein the temperature specification includes a predetermined range to allow a better estimation of lamp life before failure.

39. The method of claim 21 wherein the temperature specification includes a predetermined range to achieve a desired temperature color uniformity.

40. The method of claim 21 wherein the temperature specification includes a predetermined range to maintain light output from the lamp at a relatively constant value.

41. A method of controlling a theatre lighting device comprising a lamp that dissipates heat when in operation, the method comprising:

applying power to the lamp;

monitoring the operating temperature of the lamp with at least one thermal sensor disposed in proximity to the lamp; and varying the power during the power applying step in response to the monitoring step to maintain the operating temperature of the lamp in conformity with a predetermined temperature specification.

42. The method of claim 41 wherein:

the predetermined temperature specification is a temperature limit; and the power varying step comprises reducing power to the lamp when the operating temperature of the lamp increases beyond the temperature limit.

43. The method of claim 41 wherein the predetermined temperature specification is a temperature range, and wherein the power varying step comprises:

reducing power to the lamp when the operating temperature of the lamp rises above the temperature range; and increasing power to the lamp when the operating temperature of the lamp falls below the temperature range.

44. The method of claim 41 wherein the theatre lighting device further comprises a cooling fan, the method further comprising:

operating the fan during at least part of the power applying step; and adjusting operation of the fan during at least part of the power applying step to maintain the operating temperature of the theatre lighting device in conformity with the predetermined temperature specification.

* * * * *